UNITED STATES PATENT OFFICE.

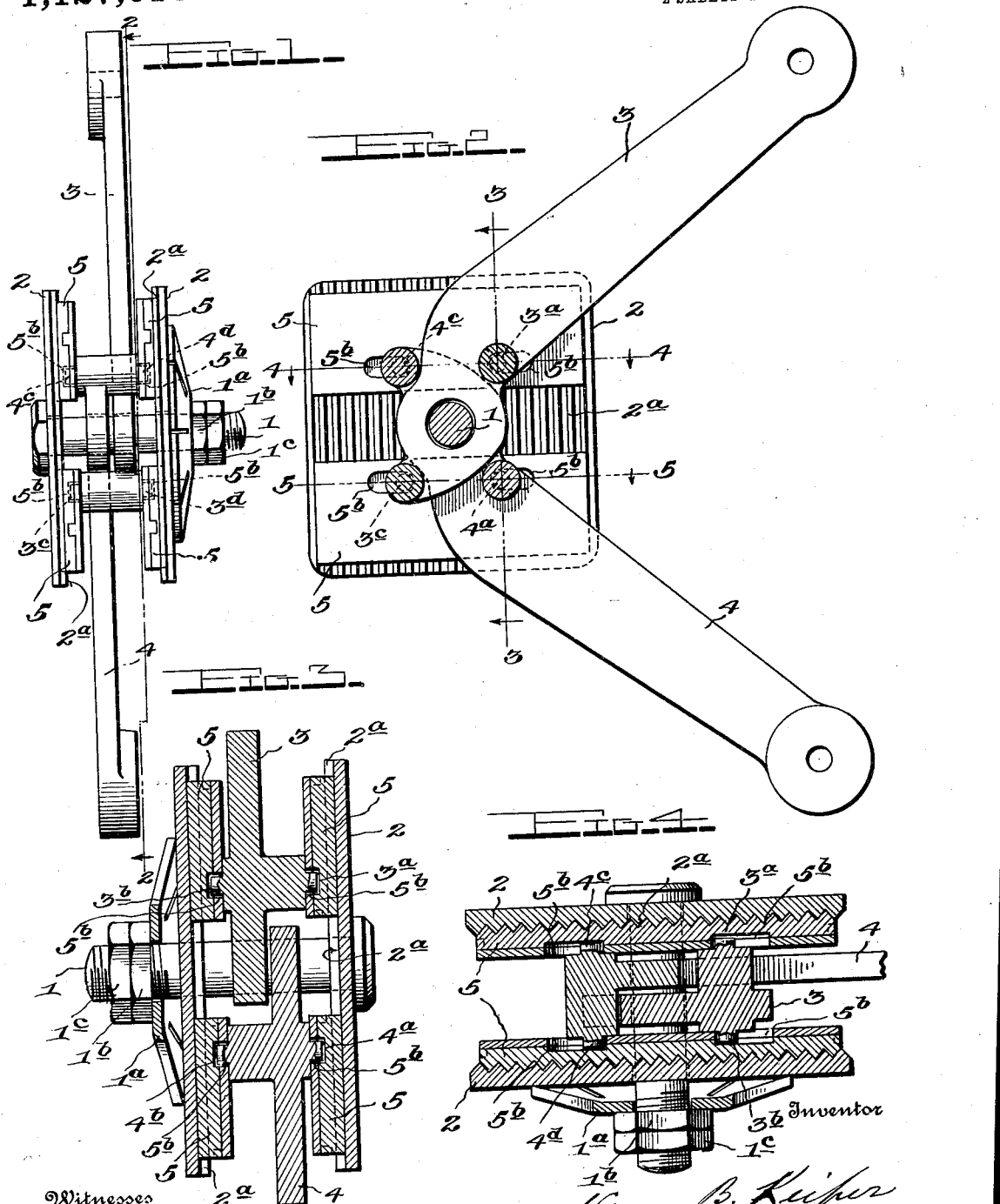

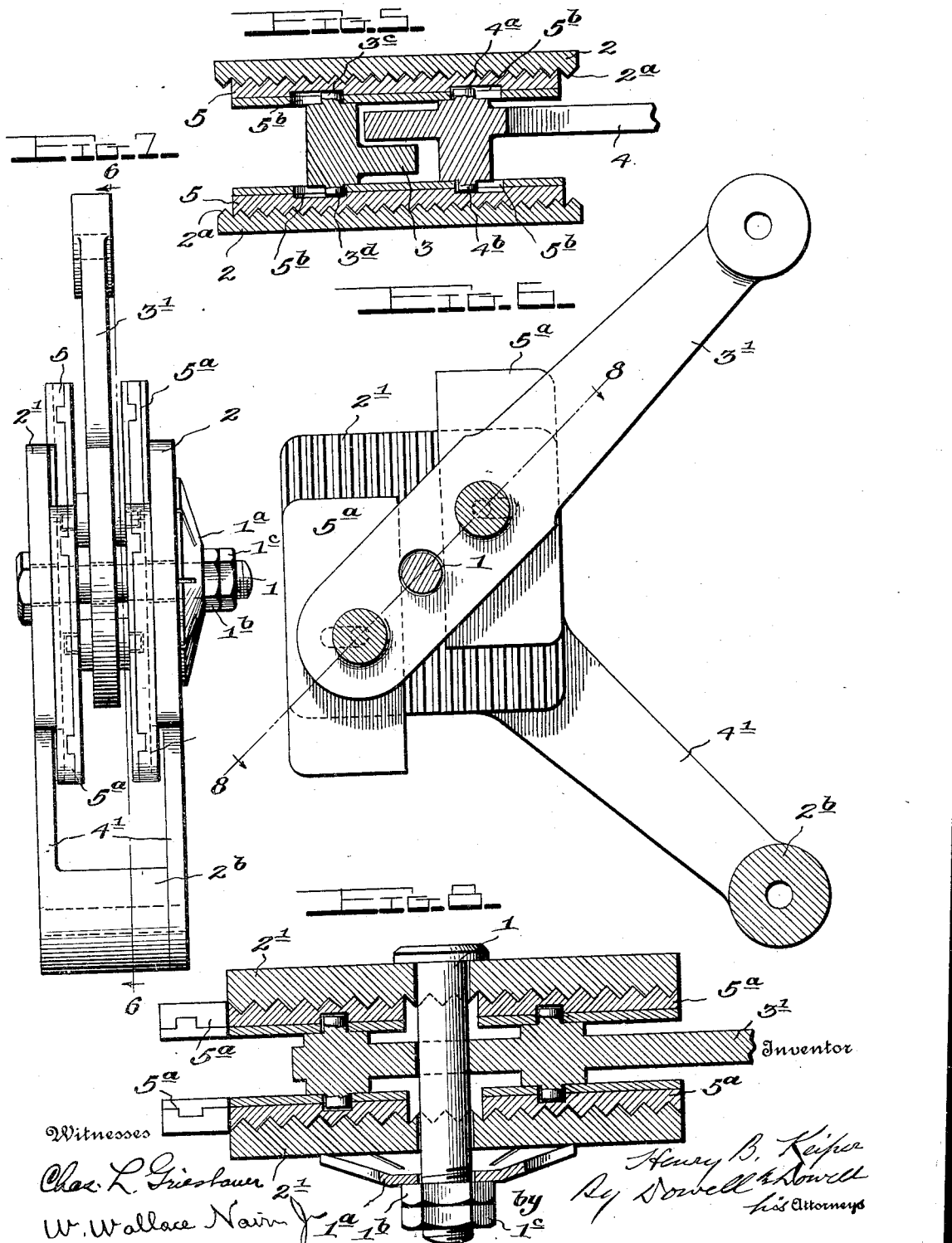

HENRY B. KEIPER, OF LANCASTER, PENNSYLVANIA.

SHOCK-ABSORBER.

1,127,016.  Specification of Letters Patent.  Patented Feb. 2, 1915.

Application filed May 8, 1914. Serial No. 837,314.

*To all whom it may concern:*

Be it known that I, HENRY B. KEIPER, a citizen of the United States, residing at Lancaster, in the county of Lancaster and State of Pennsylvania, have invented certain new and useful Improvements in Shock-Absorbers; and I hereby declare that the following is a full, clear, and exact description thereof, reference being had to the accompanying drawings, which form part of this specification.

This invention relates to shock absorbers or devices for controlling or modifying the action of vehicle springs so as to prevent the sudden rebound or return of the springs to their initial position and diminish the shocks or vibrations incident to traveling over rough roads or ruts or obstacles in the roadway.

The objects of the invention are to provide a simple, inexpensive and efficient device of the character referred to, adapted to yieldingly resist any force tending to compress or expand the supporting-springs of a vehicle and insure the return of the springs to their initial positions in such manner as to relieve the vehicle body and occupants of the vehicle of sudden shocks or jars and prevent injury to or weakening or breakage of the springs which so frequently results under the conditions above mentioned.

The invention will first be hereinafter more particularly described, with reference to the accompanying drawings, which are to be taken as a part of this specification, and then pointed out in the claims at the end of the description.

In said drawings, Figure 1 is an edge or front view of a shock absorber embodying my invention, showing in distended or expanded position the lever-arms which connect the vehicle frame or body and spring, or the leaves of a spring; Fig. 2 is a sectional side elevation of the same, the section being taken on the line 2—2 of Fig. 1, looking in the direction of the arrows; Fig. 3 is a vertical sectional view on a slightly enlarged scale, on the line 3—3 of Fig. 2, looking in the direction indicated by the arrows; Fig. 4 is a transverse section taken on the line 4—4 of Fig. 2, looking downward, or in the direction indicated by the arrows; Fig. 5 is a transverse section taken on the line 5—5 of Fig. 2, also looking downward, as indicated by the arrows; Fig. 6 is a sectional side elevation of a modified form of the invention, the section being taken on the line 6—6 of Fig. 7, looking in the direction indicated by the arrows; Fig. 7 is an edge or front view of the aforesaid modification; and Fig. 8 is a sectional view taken on the line 8—8 of Fig. 6, as seen from the rear, or looking in the direction of the arrows.

Referring to the drawings, in which the same reference characters or figures are used to denote corresponding parts in different views, 3 and 4 denote lever-arms which are fulcrumed on a short shaft or bolt 1, on which are mounted friction plates 2, which, as shown, are formed or provided on their inner faces with serrations or parallel ribs $2^a$ and intervening grooves or channels adapted to engage correspondingly ribbed and grooved or serrated outer faces of adjacent friction plates 5, which latter preferably consist of inner metallic plates faced with wooden portions suitably ribbed and grooved to engage the ribbed and grooved surfaces of the friction plates 2. The friction plates 2 may be substantially rectangular in form, as shown, though other forms may be employed, and the sliding plates 5 may be arranged in pairs on opposite sides of, or above and below, the fulcrum shaft or bolt 1, assuming the device to be arranged in the position shown in Fig. 2 of the drawings, in which position the ribs $2^a$ extend perpendicularly to the fulcrum shaft. Said plates 5 are adapted to be slid toward and from each other in frictional engagement with the plates 2 by means of studs or projections on the levers 3 and 4 engaging oblong slots $5^b$ in said plates. To this end the lever 3 is formed or provided at each side thereof with bosses or projections on opposite sides of its fulcrum, one of which projections extends beyond the adjacent lever and terminates in a stud or pintle $3^a$ engaging one of the oblong slots $5^b$ in one of the plates 5, which for convenience will be termed the upper plate, while a similar stud or pintle $3^b$ projecting from the opposite side of said lever engages another oblong slot $5^b$ in the sliding plate 5 at the opposite side of the lever. Similar bosses or projections formed or provided on the short arm or free end of the lever 3, terminate in studs or pintles $3^c$ and $3^d$, which engage similar slots in the plates 5 which are arranged below the pivot or fulcrum of the lever, so that when said lever is moved on its fulcrum the upper and lower plates 5 will be moved toward or from each other according to the direction in which the lever is moved. The co-acting lever 4 is also formed or provided at each side thereof with bosses or projections on opposite sides of its fulcrum, one of which projections extends beyond the outer side of the lever 3 and terminates in a stud or pintle $4^b$ engaging a slot $5^b$ in one of the plates 5 below the pivot bolt or fulcrum, while a similar stud or pintle $4^a$ projecting from the opposite side of said lever engages one of the slots $5^b$ in the sliding plate 5 at the opposite side of the lever, and other bosses or projections formed or provided on the short arm or free end of the lever 4 terminate in studs or pintles $4^c$ and $4^d$, which engage slots in the plates 5 arranged above the pivot bolt, so that when said lever swings on its fulcrum it will operate in unison with the lever 3, moving the upper and lower sliding plates 5 toward or from each other according to the direction in which the levers swing.

As will be seen, the described arrangement consists of a pair of levers each having a pivotal connection at one side of its fulcrum with one pair of sliding plates and also a pivotal connection at the other side of its fulcrum, with another pair of the sliding plates, so that the two sliding plates on opposite sides of the fulcrum of the levers, or above and below said bolt 1, in the position shown in Fig. 2, will be moved back and forth or toward and from each other in parallel planes by the combined action of the two levers, each acting in conjunction with the other in moving one pair of plates in one direction and another pair simultaneously in the opposite direction or toward and from each other, and the frictional resistance due to the contact of the serrated surfaces of the sliding plates with the serrated surfaces of the relatively stationary or fixed plates will be exerted in opposing the movement toward or from each other of the parts of the vehicle to which the lever-arms 3 and 4 are connected, thus modifying or controlling the action of the spring-supported parts so as to relieve them and the occupants of the vehicle of sudden shocks and jars in passing over rough and uneven roads. The degree of frictional resistance or pressure between the plates 2 and 5 may be regulated by means of a nut $1^b$ screwed on the bolt 1, and held stationary by a lock-nut $1^c$, to maintain the serrated parts of the friction plates in binding contact; a spring washer $1^a$ being preferably interposed between said nut $1^b$ and the outer face of the adjacent plate 2. The slots $5^b$ in which the pintles on the levers 3 and 4 work are slightly elongated, as shown in Figs. 2, 4 and 5, to give necessary play or freedom of movement to the lever arms 3 and 4 and compensate for the varying distance between the fulcrum and the pivotal connections of the levers with the plates 5.

In the modification shown in Figs. 6 to 8 of the drawings, the friction plates $2^1$ are each provided with an arm $4^1$, and these arms are connected together at $2^b$ and constitute, in effect, a lever corresponding with the lever 4 in Fig. 2, adapted for connection with one part of the vehicle, another part of which is connected with the lever $3^1$. The lever $3^1$ is pivotally supported or fulcrumed on the stud bolt or shaft 1 so as to swing between the arms $4^1$, and is provided at each side thereof on opposite sides of its fulcrum with lateral bosses or projections which terminate in studs or pintles adapted to engage oblong slots in the sliding plates $5^a$, said sliding plates being formed or provided with serrated or ribbed and grooved outer faces engaging similarly serrated or ribbed and grooved inner faces of the relatively fixed friction plates $2^1$, as already described with reference to the construction shown in Figs. 1 to 5 of the drawings. In this instance however the sliding plates $5^a$ are arranged in the front and rear of the pivot bolt 1, so that when the lever $3^1$ is moved on its fulcrum toward the arms $4^1$ it will move said sliding plates simultaneously in opposite directions, one moving upwardly and the other downwardly, or in a direction perpendicular to the axis of the bolt 1. The length of the sliding plates and the swing of the levers may be such that when the levers are distended to their full extent the sliding plates will project beyond the friction plates $2^1$, as indicated in Fig. 6 of the drawings. The several parts are secured together and provision made for regulating the degree of frictional pressure between the serrated surfaces of the sliding and relatively fixed plates by means of a nut on the bolt 1, together with a lock-nut and interposed spring washer, as already described with reference to the construction shown in Figs. 1 to 5 of the drawings.

It will be seen that in both of the illustrated embodiments of my invention frictional contact between the levers 3 and 4 or $3^1$ and $4^1$ is prevented by the bosses on the levers, against which the sliding plates abut, and these bosses also prevent any appreciable frictional contact between the levers and the sliding plates, while the serrated or equivalent ribbed and grooved construction of the contacting surfaces of the friction plates serve the double purpose of increasing the frictional area and assisting in guiding the sliding plates in their reciprocatory movements. It will also be seen that whether the sliding plates are arranged to move sidewise, as shown in Figs. 2 to 5, or lengthwise, as shown in Figs. 6 to 8, they are kept in parallel planes throughout the length of their movement, and a frictional surface of large area is presented creating a yielding resistance opposed to any force tending to move the lever-arms toward or from each other, so as to prevent a quick return of a spring to its initial or normal position when compressed or distended and avoid shocks and jars or disagreeable vibrations.

It will be understood of course that the position of the sliding plates, whether above and below the pivot bolt, or in front and rear thereof, as shown more clearly in Figs. 2 and 6, respectively, of the drawings, depends upon the position in which the device may be placed at the time, and the terms "upper" and "lower" and "front" and "rear", as used herein, have reference to the position illustrated in the drawings, considering the sliding plate nearest the top of the sheet in Fig. 2 the "upper" one, and the sliding plate nearest the right hand side of the sheet in Fig. 6 the "front" one; and it is obvious that said sliding plates might be arranged in various other positions, there being a sliding plate or plates on each side of the fulcrum of the lever and one or more plates at one side of the fulcrum being arranged to move in one direction while another plate or plates at the other side of such fulcrum is arranged to move in an opposite direction. Friction plates without serrated or ribbed and grooved contacting surfaces may also be used, being otherwise adapted to produce friction by sliding contact of one surface upon another together with means for guiding the movements of the sliding plates in straight lines across the surface of the relatively fixed plates or perpendicularly to the axis of the fulcrum of the lever.

While I preferably employ a pair of sliding plates engaging friction plates on both sides of the swinging lever and on opposite sides of the fulcrum of the lever, it may be desirable in some cases to omit the friction plates at one side, instead of using a pair of plates at each side, and hence I do not desire to be limited to the use of such plates in pairs only, as it is obvious that one of the friction plates might be omitted; the lever 3¹, for example, might be formed or provided with pintles at one side thereof only engaging slots in sliding plates at the same side of the lever but on opposite sides of its fulcrum, instead of having pintles on both sides of the lever engaging a pair of sliding plates arranged on opposite sides of its fulcrum, as shown in Figs. 6, 7 and 8 of the drawings.

Various other changes may be made in the details and in the form and arrangement of parts without departing from the spirit and scope of my invention.

Having thus described my invention, what I claim as new and desire to secure by Letters Patent is:

1. In a device of the character described, a relatively fixed friction plate having a serrated surface, a plurality of sliding plates having serrated surfaces engaging the serrated surface of said fixed plate, a rocking lever, means for securing said plates and lever together, and means on said lever engaging said sliding plates so as to cause them to move in opposite directions when said lever is rocked.

2. In a device of the character described, a plurality of friction plates having serrated inner faces, co-acting sliding plates having serrated outer faces engaging the serrated faces of said friction plates and parallel slots in the inner face thereof, a swinging lever between said sliding plates having a pintle at each side of its fulcrum engaging one of the slots in one of the sliding plates, and means for securing said parts together, whereby said sliding plates are moved simultaneously in opposite directions when the lever is rocked.

3. In a device of the character described, relatively fixed plates serrated on their inner faces, multiple sliding plates each having a serrated surface engaging the serrated face of one of said friction plates and parallel slots in the other side thereof, and a pair of levers fulcrumed on the same shaft each having pintles on opposite sides of its fulcrum with those at one side engaging the slots in one of said side sliding plates and those on the other side engaging slots in another sliding plate.

4. In combination with relatively fixed friction plates having opposed serrated faces, movable plates having serrated faces engaging the serrations of said relatively fixed plates and a lever-arm or arms fulcrumed on a shaft connecting said relatively fixed plates and having pivotal connections with said movable plates on opposite sides of said fulcrum, whereby when the lever-arm is rocked movement is imparted to said movable plates and the plates on opposite sides of said fulcrum moved simultaneously in opposite directions.

5. In combination with relatively fixed friction plates having opposed serrated faces, a lever-arm or arms fulcrumed on a shaft connecting said plates, movable plates interposed between said lever-arms and said friction plates and having serrated faces engaging the serrations of said friction plates, said lever-arms having pintles engaging oblong slots in said movable plates on opposite sides of said fulcrum, whereby when said lever-arms are rocked movement is imparted to said movable plates causing those on opposite sides of the fulcrum to slide in opposite directions.

6. In combination with relatively fixed friction plates having opposed serrated faces, a lever-arm or arms fulcrumed on a shaft connecting said plates, movable plates interposed between said lever-arms and said friction plates and having serrated faces engaging the serrations of said friction plates, said lever-arms having pintles on both sides thereof engaging oblong slots in said movable plates on opposite sides of said fulcrum, whereby when said lever-arms are rocked movement is imparted to said movable plates causing those on opposite sides of the fulcrum to slide in opposite directions.

7. In combination with relatively fixed friction plates having opposed serrated faces, a pair of levers fulcrumed on a shaft connecting said plates, each lever having pintles on opposite sides thereof, friction plates on opposite sides of said levers having serrated faces slidably engaging the serrations on said relatively fixed plates, and oblong slots to receive said pintles on opposite sides of said fulcrum, whereby the sliding plates arranged on opposite sides of the fulcrum of the lever are moved simultaneously toward and from each other by the combined action of the two levers.

8. In combination with relatively fixed friction plates having opposed serrated faces and sliding plates each having a serrated face engaging the serrations of one of said relatively fixed plates and oblong slots in the opposite side thereof, a lever between said sliding plates fulcrumed on a shaft connecting said relatively fixed plates, said lever having on opposite sides thereof pintles engaging oblong slots in a plurality of sliding plates arranged on opposite sides of said fulcrum.

9. In combination with relatively fixed friction plates having opposed serrated faces and co-acting sliding plates having serrated faces engaging the serrations of said relatively fixed plates, swinging levers interposed between said sliding plates and fulcrumed on a shaft connecting said relatively fixed plates, each lever having on opposite sides thereof pintles engaging oblong slots in a sliding plate or plates arranged on opposite sides of said fulcrum; the pintles at one side of each lever projecting beyond the outer side of the other lever.

10. A shock absorber comprising friction plates having opposed frictional surfaces, one slidably engaging the other, and a pair of levers fulcrumed therebetween on the same shaft, each lever having a pintle at each side of its fulcrum, one pintle engaging a slot in a sliding plate arranged on one side of said fulcrum and the other pintle engaging a slot in another sliding plate arranged on the other side of said fulcrum; said sliding plates having serrated faces engaging serrated faces of said friction plates.

11. A shock absorber comprising relatively fixed and movable plates having contacting frictional surfaces, and a lever fulcrumed on a bolt for securing said plates together, said lever having a pivotal connection at each side of its fulcrum with one or more of said movable plates adapting two or more plates to be moved simultaneously in opposite directions.

12. A shock absorber comprising relatively fixed and movable plates having contacting frictional surfaces, one of said contacting surfaces being faced with wood having a metal backing, and a lever fulcrumed on a bolt for securing said plates together, said lever having a pivotal connection at each side of its fulcrum with one or more of said movable plates adapting two or more plates to be moved simultaneously in opposite directions.

In testimony that I claim the foregoing as my own, I affix my signature in presence of two witnesses.

HENRY B. KEIPER.

Witnesses:
CHAS. E. LONG,
GEO. HAMMOND.

Copies of this patent may be obtained for five cents each, by addressing the "Commissioner of Patents, Washington, D. C."